United States Patent [19]

Gaffney et al.

[11] Patent Number: 5,266,102
[45] Date of Patent: Nov. 30, 1993

[54] $O_2$ VSA PROCESS WITH LOW $O_2$ CAPACITY ADSORBENTS

[75] Inventors: Thomas R. Gaffney, Allentown; John F. Kirner, Orefield; Ravi Kumar, Allentown; Robin J. Maliszewskyj, Hatfield; William P. Schmidt, Allentown, all of Pa.

[73] Assignee: Air Products and Chemicals, Inc., Allentown, Pa.

[21] Appl. No.: 950,093

[22] Filed: Sep. 23, 1992

[51] Int. Cl.$^5$ .............................................. B01D 53/04
[52] U.S. Cl. ......................................... 95/103; 95/130
[58] Field of Search ................ 55/25, 26, 58, 62, 68, 55/75, 389

[56] References Cited

U.S. PATENT DOCUMENTS

| | | | |
|---|---|---|---|
| 3,140,931 | 7/1964 | McRobbie | 55/25 |
| 3,140,932 | 7/1964 | McKee | 55/68 |
| 3,140,933 | 7/1964 | McKee | 55/68 |
| 3,313,091 | 4/1967 | Berlin | 55/58 |
| 3,356,450 | 12/1967 | Heinze | 23/112 |
| 3,636,679 | 1/1972 | Batta | 55/26 |
| 4,013,429 | 3/1977 | Sircar et al. | 55/33 |
| 4,481,018 | 11/1984 | Coe et al. | 55/68 |
| 4,544,378 | 10/1985 | Coe et al. | 55/68 |
| 4,557,736 | 12/1985 | Sircar et al. | 55/62 |
| 4,603,040 | 7/1986 | Kuznicki et al. | 423/328 |
| 4,810,265 | 3/1989 | Lagree et al. | 55/26 |
| 4,818,508 | 4/1989 | Flank et al. | 423/328 |
| 4,859,217 | 8/1989 | Chao | 55/68 |
| 4,917,710 | 4/1990 | Haruna et al. | 55/26 |
| 4,925,460 | 5/1990 | Coe et al. | 55/25 |
| 5,071,449 | 12/1991 | Sircar | 55/26 |
| 5,074,892 | 12/1991 | Leavitt | 55/25 |
| 5,114,440 | 5/1992 | Reiss | 55/25 |
| 5,152,813 | 10/1992 | Coe et al. | 55/26 |
| 5,174,979 | 12/1992 | Chao et al. | 55/58 X |

FOREIGN PATENT DOCUMENTS 1567856 5/1980 United Kingdom .

OTHER PUBLICATIONS

Coe, et al; "Molecularly Engineered, High-Performance Adsorbent . . . "; ACS Symposium Series 368; 1988; pp. 478–491.

Primary Examiner—Robert Spitzer
Attorney, Agent, or Firm—Geoffrey L. Chase; James C. Simmons; William F. Marsh

[57] ABSTRACT

The invention is a process for selectively adsorbing nitrogen from a gas mixture which comprises contacting the gas mixture with an adsorbent that has a moderate nitrogen capacity and a high selectivity for nitrogen over the other components in the mixture. With respect to air separation, improved adsorbents have low $O_2$ capacity with $N_2$ capacity at roughly the same level as current adsorbents such as CaA. $O_2$ VSA computer process simulations have shown the unexpected result that for materials with the same binary isothermal working selectivity, those with lower isothermal nitrogen working capacity are superior $O_2$ VSA adsorbents, provided that they have a nitrogen working capacity of at least about 0.3 mmol/g.

19 Claims, 5 Drawing Sheets

5,266,102

O₂ VSA PROCESS WITH LOW O₂ CAPACITY ADSORBENTS

FIELD OF THE INVENTION

The present invention is directed to the separation of nitrogen from gas streams, such as air. More specifically, the present invention is directed to improved adsorbents for effecting this separation using pressure/vacuum swing adsorption (P/VSA) processes with reduced levels of power consumption.

BACKGROUND OF THE PRIOR ART

Separations of gas mixtures containing nitrogen and oxygen are important industrial processes. The recovery of oxygen and/or nitrogen from air is practiced on a large scale. In the past, the primary method used for this separation was cryogenic distillation. More recently, pressure/vacuum swing adsorption (P/VSA) processes are being used in applications which have smaller gas requirements. In P/VSA processes, compressed gas is fed through a bed containing an adsorbent material with a preference for one of the components of the gas to produce an exit stream enriched in the other components. A stream enriched in the adsorbed component can be obtained by desorption.

P/VSA processes for selectively adsorbing nitrogen from gas mixtures, such as air, comprise contacting the gas mixture with a zone containing an adsorbent which is selective for the adsorption of nitrogen. Typically, the zone is operated through a series of steps comprising: adsorption, during which the gas mixture contacts the adsorbent, nitrogen is selectively adsorbed and oxygen passes through the zone and can be recovered as product; depressurization, during which the gas mixture contact is discontinued and the zone is reduced in pressure to desorb the nitrogen which can be recovered as product; and repressurization with air or oxygen product to the adsorption pressure.

The process performance depends on Bed Size Factor (BSF), O₂ Recovery, and Actual Cubic Feet evacuated/lbmol Evacuation gas (ACF/Evac). BSF (lb adsorbent/lbmole O₂ in product) is an indication of the size of the adsorbent beds and the amount of adsorbent, the major impact of which is on capital equipment costs. Recovery is a measure of the O₂ in the feed that is obtained as product. BSF is inversely proportional to the N₂ working capacity, and inversely proportional to the O₂ Recovery. Recovery in turn influences BSF and ACF, and has a strong impact on operating costs such as utility costs for the feed air blower. ACF/Evac, or actual cubic feet evacuated per lbmole of evacuation gas, influences capital (size of the vacuum train) and utility costs (power for running the vacuum pumps).

The use of zeolitic molecular sieves in PSA processes for air separation is well known. McRobbie in U.S. Pat. No. 3,140,931 claims the use of crystalline zeolitic molecular sieve material having apparent pore sizes of at least 4.6 Angstroms for separating oxygen-nitrogen mixtures at subambient temperatures. Of this group of zeolites, the Na form of X-zeolite (NaX) has often been used to advantage in air separation processes. There have been numerous efforts to develop improved adsorbent materials having high adsorptive capacity for N₂ and high selectivity of N₂ over O₂. The Ca form of A-zeolite (CaA), for instance, was the basis of the Batta U.S. Pat. No. 3,636,679 for producing 90+% O₂ from air via a PSA process. Later, Sircar and Zondlo (U.S. Pat. No. 4,013,429) patented a VSA air separation process using Na-mordenite (NaMOR). Coe et al. in U.S. Pat. Nos. 4,481,018 and 4,544,378 demonstrated the improved performance of faujasite compositions containing divalent cations, such as CaX, provided that they were activated in such a way that a preponderance of the polyvalent cations were in the dehydrated/dehydroxylated state.

Formed adsorbent particles containing zeolites used for equilibrium air separation also typically contain about 20 wt % inert inorganic material. The purpose of this material is to bind the zeolite crystallites into an agglomerate having high physical strength and attrition resistance in order that the zeolite crystallites can be used in adsorption processing. Those skilled in the art have generally believed that the addition of binder reduces the adsorptive properties of the adsorbent zone. In the past, the trend has been to try to reduce the levels of binder from the typical 20% to as low as possible, often as low as 5%, while at the same time maintaining adequate crush strength. For example, Heinze in U.S. Pat. No. 3,356,450 states that it is advantageous to obtain hard formed zeolite particles with the lowest possible binder content to maintain high adsorption capacity. He claims the use of a process which starts with molecular sieve granules bound with silicic acid, which are then treated with aqueous solutions containing alumina and alkali metal hydroxide, whereby the binder is converted to molecular sieve particles. The result is a practically binder-free (and therefore high capacity) shaped material with good abrasion resistance.

At the extreme of this trend toward reduced binder contents is the development of processes for preparing binderless bodies. Flank et al. (U.S. Pat. No. 4,818,508) teach the preparation of zeolites, particularly X, Y, and A, in massive bodies from calcined preforms made of controlled-particle-size kaolin-type clay. Kuznicki et al. (U. S. Pat. No. 4,603,040) teach the preparation of low silica X-zeolite (LSX) in the form of essentially binderless aggregates by reaction of calcined kaolin preforms in an aqueous solution of NaOH and KOH. W. R. Grace & Co. in GB 1,567,856 teaches a process for converting an extruded mixture of metakaolin and sodium hydroxide to A-zeolite. The advantage stated is that the method does not require the use of a binder such as clay, which usually reduces the activity of the molecular sieve by 15-20%.

Recently, adsorbents produced using these binderless bodies have been stated to have superior adsorptive properties when used for air separation. One such adsorbent is CaLSX, prepared by Coe et al., using the process of Kuznicki et al. (Coe, et al., "Molecularly Engineered, High-Performance Adsorbent: Self-Bound Low-Silica X Zeolite" in Perspectives in Molecular Sieve Science; Flank, W. H.; Whyte, Jr., T. E., Eds.; ACS Symposium Series 368; American Chemical Society: Washington, D.C., 1988; pp 478-491). "The self-bound LSX adsorbents do not have any binder to 'dilute' the active component and lower the gas capacity." In addition, Coe et al. in U. S. Pat. No. 4,925,460 prepared chabazite from Y-zeolite extrudate. They state, "This method produces a superior adsorbent, since adsorptive capacity decreases as binder content increases." These materials were converted to the Li form and used for separation of air, among other gas separation processes. Thirdly, Chao in U.S. Pat. No. 4,859,217 claims a process for selectively adsorbing N₂ using X- zeolite having a framework Si/Al molar ratio not greater than 1.5 and having at least 88% of its AlO$_2$ tetrahedral units associated with Li cations. He converted the bulk of the 20% binder in a zeolite "preform" agglomerate to X-zeolite crystals, obtaining essentially a binderless zeolite prior to ion exchanging into the Li form.

These more recent developments have shown really outstanding increases in capacity compared to the intrinsic capacity (i.e., capacity of the unbound zeolite) of adsorbents in the prior art. It is noteworthy that even the very high capacity materials described in these more recent developments were prepared in the binderless form. Thus, the prior art teaches that continued increase in capacity is better, there apparently being no upper limit. The desire for higher nitrogen capacity materials is understandable because it lowers the capital investment for the zeolite and adsorbent vessel. Higher nitrogen capacity also decreases the losses of O$_2$ in the voids of the bed, which is expected to increase recovery and thereby lower power requirements.

However, nitrogen capacity is not the only property of the adsorbent that is important for low cost O$_2$ production by P/VSA processes. The selective or preferential adsorption of N$_2$ over O$_2$ is also important, because any O$_2$ which is coadsorbed on the adsorbent bed with N$_2$ during the adsorption step is lost during the subsequent desorption step(s), resulting in lower O$_2$ recovery. Selectivity ($\alpha$) has conventionally been defined at a specific temperature and pressure in the following way:

$$\alpha(N_2/O_2) = (N_{N2}/Y_{N2})/(N_{O2}/Y_{O2})$$

where $N_{N2}$ = N$_2$ coadsorbed at N$_2$ partial pressure in the feed
$N_{O2}$ = O$_2$ coadsorbed at O$_2$ partial pressure in the feed
$Y_{N2}$ = mole fraction of N$_2$ in the feed
$Y_{O2}$ = mole fraction of O$_2$ in the feed The very high nitrogen capacities of these recently developed adsorbents have generally been accompanied by higher selectivities. The prior art has recognized the benefits of this higher selectivity. Chao (above) points out the advantages of the high selectivity of the LiX materials and Coe et al. (above) point out the advantages of the high selectivity of CaLSX.

Selectivity and recovery impact power costs because they determine the amount of feed gas that must be compressed for the adsorption step per unit of product recovered. The cost of power is as important as the cost of capital in determining commercial viability of a PSA or VSA process. Thus, it is desirable to lower power consumption levels as much as possible.

The prior art VSA air separation processes using the recently developed very high nitrogen capacity materials described above have not been able to take full advantage of the very high selectivity of these materials in maximizing recovery and minimizing power requirements for compression. In contrast to the prior art, the present invention has found that for a given selectivity, nitrogen capacity lower than the very high capacity of these materials actually results in higher recovery. Furthermore, the evacuation step also requires high power consumption levels when these very high nitrogen capacity materials are used, so moderating their nitrogen capacity also results in evacuation power savings.

Thus, despite the previously recited substantial advances in adsorbents for PSA air separation of the prior art, there still exists a genuine need for more efficient air separation processes, particularly at very low power consumption levels, such as the present invention uniquely achieves as will be set forth below in greater detail below with regard to the present invention.

BRIEF SUMMARY OF THE INVENTION

The present invention is a process of selectively adsorbing nitrogen from a gas mixture containing nitrogen and at least one less strongly adsorbed other gas component, comprising; contacting the gas mixture in an adsorption zone with an adsorbent selective for nitrogen, selectively adsorbing nitrogen on the adsorbent and passing the gas mixture less the adsorbed nitrogen out of the zone, wherein the adsorbent zone comprises an adsorbent with an isothermal nitrogen working capacity of at least about 0.3 mmol/g and a binary isothermal working selectivity of at least 17 mmol N$_2$/mmol O$_2$ but whose nitrogen working capacity at any given working selectivity (S) does not exceed the value: $0.0667 \times (S) - 0.667$ (for a gas mixture feed at 23° C. and 1.45 atm. and evacuation at 0.2 atm.).

Preferably, the isothermal nitrogen working capacity is at least 0.4 mmol/g.

Preferably, the isothermal nitrogen working capacity is no greater than 1.0 mmol/g.

More preferably, the isothermal nitrogen working capacity is between 0.4 and 0.6 mmol/g.

Preferably, the adsorbent comprises an active adsorbent phase and optionally an inert diluent.

Preferably, the active adsorbent phase is selected from the group consisting of zeolite, silica-alumina, alumina, silica, titanium silicates, phosphates and mixtures thereof.

Preferably, the active adsorbent phase is a zeolite selected from the group consisting of A-zeolite, X-zeolite, Y-zeolite, chabazite, mordenite and mixtures thereof.

Preferably, the active adsorbent phase has a zeolitic silicon to aluminum ratio less than or equal to 1.5.

Preferably, the zeolite is ion exchanged with lithium to at least approximately 50%.

More preferably, the zeolite is ion exchanged with a second ion to approximately 5% to 50%.

Most preferably, the zeolite is ion exchanged with approximately 15% of the second ion and 85% lithium.

Preferably, the second ion is selected from the group consisting of calcium, strontium and mixtures thereof.

Preferably, the zeolite is ion exchanged with approximately 15% calcium and 85% lithium.

Preferably, the gas mixture contains nitrogen and oxygen.

More preferably, the gas mixture is air.

Preferably, an oxygen and nitrogen-containing gas mixture contacts said adsorbent zone, the nitrogen is selectively adsorbed and the oxygen passes through said zone and is recovered as an oxygen-enriched product.

Preferably, the oxygen product has a purity of at least approximately 90% oxygen.

More preferably, the zone is operated through a series of steps comprising: adsorption during which the gas mixture contacts said active adsorbent phase, nitrogen is selectively adsorbed and oxygen passes through the zone and is removed; depressurization during which the gas mixture contact is discontinued and the zone is reduced in pressure to desorb the nitrogen; and repressurization with oxygen or the gas mixture to the adsorption pressure.

Alternatively, the zone is operated through a series of steps comprising: adsorption during which the gas mixture contacts said active adsorbent phase, nitrogen is selectively adsorbed and oxygen passes through the zone and is removed; depressurization during which the gas mixture contact is discontinued and the zone is reduced in pressure to desorb the nitrogen; evacuation to further desorb the nitrogen to below ambient pressure; and repressurization with oxygen or the gas mixture to the adsorption pressure.

DETAILED DESCRIPTION OF THE INVENTION

Figure 1:
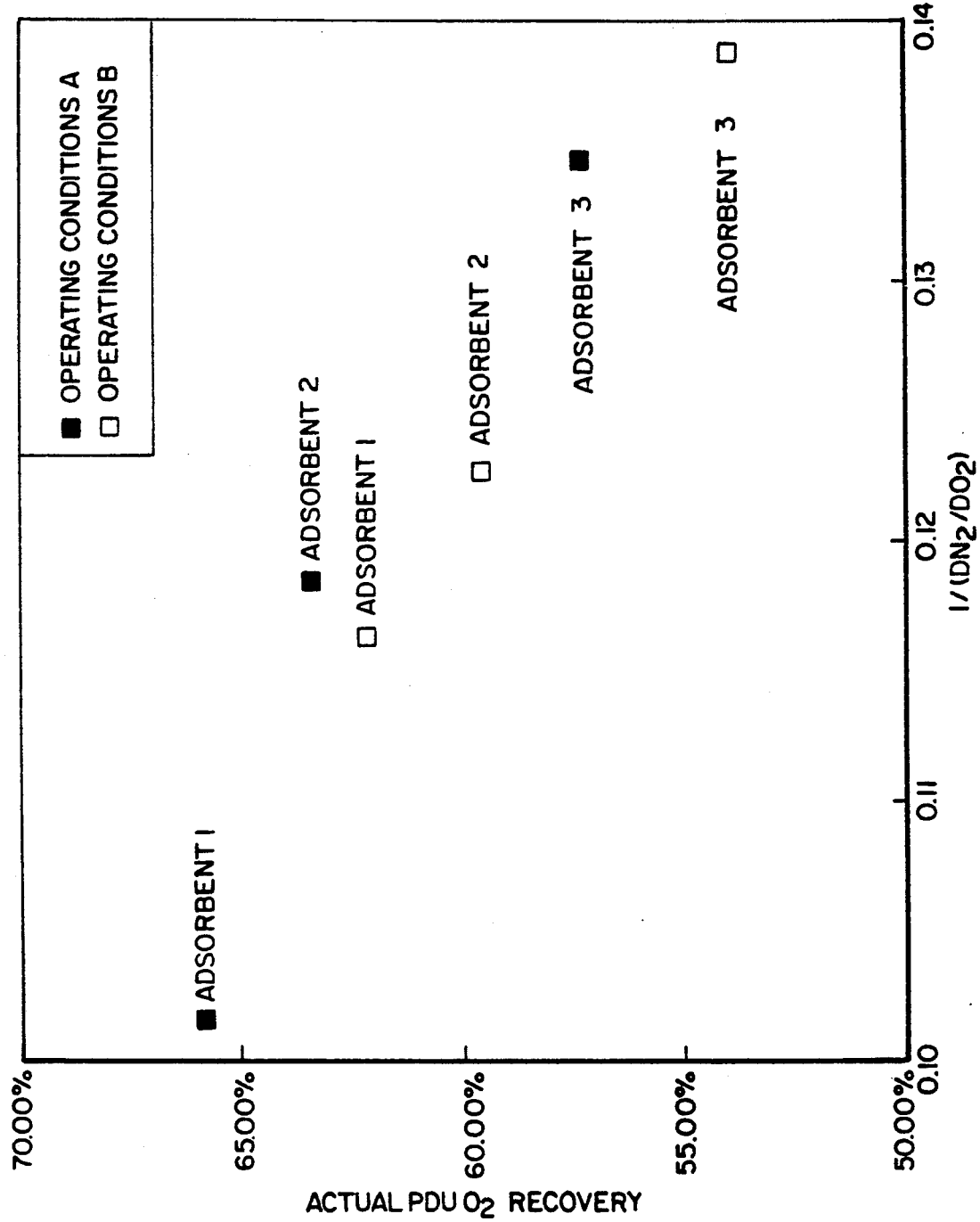
FIG. 1 is a plot of $O_2$ Recovery determined from actual vacuum swing adsorption process development unit runs as a function of 1/(isothermal binary working selectivity) for three zeolitic adsorbents with very different intrinsic properties and two different operating conditions (A and B).

The invention is an improved process for selectively adsorbing nitrogen from a gas mixture which comprises contacting the gas mixture with an adsorbent that has a moderate nitrogen capacity and a high selectivity for nitrogen over the other components in the mixture. With respect to air separation, the improved adsorbents of the present invention have low $O_2$ capacity with $N_2$ capacity at roughly the same average level as current adsorbents, such as CaA. While not being constrained to a specific adsorptive separation process, the desired adsorptive properties of the improved adsorbent are defined by the representative values of isothermal nitrogen working capacity and isothermal binary working selectivity (nitrogen working capacity/oxygen working capacity) for an air feed at 23° C. and 1.45 atm and evacuation at 0.2 atm. The adsorbent is described as having a nitrogen isothermal working capacity of at least about 0.3 mmol/g and a binary isothermal working selectivity of at least about 17, but whose nitrogen working capacity at any given working selectivity does not exceed the value defined by a line through the nitrogen working capacity of about 0.6 mmol/g at a binary working selectivity of 19 and a nitrogen working capacity of about 1.0 mmol/g at a binary working selectivity of 25. See FIG. 5. Typically, the adsorbent comprises a crystalline zeolite. Preferably, the nitrogen working capacity is at least about 0.4 mmol/g and no greater than about 0.6 mmol/g.

$O_2$ VSA computer process simulations have shown the unexpected result that for materials with the same binary isothermal working selectivity, those with lower isothermal nitrogen working capacity give higher recovery and lower power consumption levels in $O_2$ VSA, provided that they have a nitrogen working capacity of at least about 0.3 mmol/g. It has also been discovered that higher isothermal binary working selectivity, a concept based on intrinsic properties of the adsorbent described below, results in higher $O_2$ recovery. When the observed beneficial effect of lower isothermal $N_2$ working capacity on performance is combined with the concept of isothermal binary working selectivity, a region of intrinsic properties of adsorbents can be delineated that will provide improved $O_2$ VSA process performance over adsorbents known in the prior art. Thus an adsorbent with adsorptive properties that fall in the region defined in the preceding paragraph will perform better than other materials with the same working selectivity known in the prior art, all of which have higher nitrogen working capacities.

In equilibrium-based P/VSA processes for separating air, it has been common practice to select adsorbents solely on the basis of high nitrogen capacity and high selectivity ($\alpha$), defined in the conventional manner at feed air pressure and temperature. However, selection of adsorbents based on these intrinsic properties of the adsorbent have been inadequate because the overall performance of the P/VSA process depends as much on the desorption steps as on the adsorption step. Thus, it has been recognized that the BSF is more closely related to the working capacity of the adsorbent between the adsorption and desorption pressures than to the absolute capacity of the adsorbent at the partial pressure of N in the feed. Until now, no comparable intrinsic property of the adsorbent has been used successfully to predict $O_2$ Recovery. Attempts to relate selectivity in the conventional sense to recovery have been partially successful, but not entirely satisfactory. In the present invention, a better way has been discovered to relate intrinsic adsorbent properties to Recovery which is described below.

It is informative to look at recovery in terms of where the $O_2$ is lost. There are two sources of $O_2$ loss in the desorption steps: 1) $O_2$ present in the void space in the adsorbent bed at the end of the feed step, and 2) $O_2$ coadsorbed with $N_2$ on the adsorbent at the end of the feed step. This can be written as follows:

$$R = 1 - n - y$$

where;
  R = $O_2$ recovery (fractional)
  n = $O_2$ lost in voids (fractional)
  y = $O_2$ lost by coadsorption (fractional)

Algebraic expressions can be derived for n and y. The $O_2$ lost by coadsorption, y, varies much more from one zeolitic adsorbent to another than n, and is inversely proportional to the ratio of the isothermal nitrogen working capacity ($DN_2$) to the isothermal oxygen working capacity ($DO_2$). This ratio, $DN_2/DO_2$ will be termed the isothermal binary working selectivity when capacities are those of the binary mixture, which can be determined experimentally or can be estimated using Ideal Adsorbed Solution Theory (IAST) (see below). Defined in this manner, higher isothermal binary working selectivity gives higher recovery.

FIG. 1 shows actual Process Development Unit (PDU) $O_2$ recovery as a function of 1/(isothermal binary working selectivity) for three zeolitic adsorbents with very different intrinsic properties at two different sets of operating conditions (A and B). There is a very good inverse correlation between recovery and $DN_2/DO_2$.

In the present invention, it has been discovered that when the observed beneficial effect of lower isothermal $N_2$ working capacity on performance is combined with the concept of isothermal binary working selectivity, a region of intrinsic properties of adsorbents can be delineated that will provide improved process performance over adsorbents known in the prior art.

The adsorbent can be comprised of any of a number of active adsorbent phases, such as zeolites, silica-alumina, alumina, silica, titanium silicates, phosphates and mixtures thereof, provided that the material has the adsorptive properties described above. Active adsorbent phase for purposes of the present invention means the adsorbent material in the adsorbent or adsorbent zone, such as a zeolite, which actually participates or contributes to the adsorption of the desired adsorbate and has a high $N_2$ isothermal working capacity. Such a phase can be mixed integrally or intimately with an inert binder or diluent, where inert for purposes of the present invention means a material having substantially no nitrogen capacity.

The adsorbent could contain binders traditionally used to form zeolite pellets, tablets, or beads for PSA processing such as silica, alumina, aluminosilicates, bentonite, kaolin, and attapulgite using methods described in the prior art, such as moulding machines, pelletizers, granulators, and extruders. The optimum working capacity described above becomes the optimum working capacity of the active-adsorbent-phase/binder mixture if binder is used.

This invention would preferably be utilized in the separation of nitrogen from oxygen in air using a pressure swing adsorption (PSA) or vacuum swing adsorption (VSA) process. In such a process, an adsorbent bed is initially pressurized with oxygen or air to a pressure between 0.5 atmospheres and 3 atmospheres. A gas stream comprising nitrogen and oxygen, such as air at a temperature between 0° C. and 50° C. and a pressure between 0.5 atmospheres and 5 atmospheres, is passed over the adsorbent bed. A portion of the nitrogen in the gas stream is adsorbed by said adsorbent, thereby producing an oxygen-enriched product stream. The nitrogen-containing adsorbent bed is subsequently depressurized with the option of being purged with oxygen-enriched gas to produce a nitrogen-enriched stream. Said depressurization is preferably performed at vacuum levels to gain the greatest advantage. The bed is then repressurized with product oxygen or air and adsorption can be reinitiated. The depressurizing beds may be pressure equalized with repressurizing beds to save compression power.

$O_2$ VSA process performance was simulated using a global energy and mass balance model similar to one described by Smith, 0. J. and Westerberg, A. W., "The Optimal Design of Pressure Swing Adsorption Systems," Chemical Eng. Sci. 46(12), 2967-2976, 1991, which is routinely used as an indicator of relative performance in adsorbent screening. This model is similar to "Flash" calculations in distillation (e.g., W. L. McCabe, and J. C. Smith, "Unit Operations in Chemical Engineering", 3rd edition, McGraw Hill, New York (1976), p. 534).

The computer process model was used to simulate a standard $O_2$ VSA process cycle, such as that described in GB 2,109,266-B that included adsorption, purge, and desorption at chosen pressures and end-of-feed temperature. The model is equilibrium based; i.e., it assumes no spatial concentration gradients and complete bed utilization. Temperature changes within the bed during the cycle are included, but the model does not account for temperature gradients (i.e., the bed temperature is uniform at any given time). As a first approximation, this is a reasonable assumption in the case of equilibrium-based separation processes. Binary equilibria are estimated using ideal adsorbed solution theory (IAST) (A. L. Meyers and J. M. Prausnitz, American Institute of Chemical Engineers Journal, 11, 121 (1965)). This theory is accepted for physical adsorption of nitrogen-oxygen mixtures on zeolites at ambient temperatures (G. W. Miller, K. S. Knaebel, and K. G. Ikels, "Equilibria of Nitrogen, Oxygen, Argon, and Air in Molecular Sieve 5A," American Institute of Chemical Engineers Journal, 33, 194 (1987)). Inputs for the program include isotherm parameters for $N_2$ and $O_2$, and adsorbent physical properties. For these simulations, adsorbents with a wide range of capacities and selectivities representative of realistic adsorbents were simulated by selection of appropriate parameters for the $N_2$ and $O_2$ isotherm models.

By way of placing the model in perspective, its predictions are comparable with data from an experimental vacuum swing adsorption process development unit with 8 feet long, 4 inch diameter beds. Data were compared for three different adsorbents at a variety of operating conditions. There is excellent agreement between process development unit data and model predictions for BSF, Recovery, and ACF/Evac. These are the key parameters that determine the product cost from any oxygen VSA plant.

As adsorbents with different selectivities and capacities behave differently within the described VSA cycle, each will achieve optimum performance at a unique set of operating conditions (herein defined as end-of-feed temperature, feed pressure, and evacuation pressure). A statistical method was used to identify these optimum operating conditions based on minimum $O_2$ product price. Inputs to the program were adsorbent price, power cost, and plant size (production). Power cost and plant size were held constant for all simulation results presented herein.

EXAMPLE 1

Effect Of Isothermal $N_2$ Working Capacity On The $O_2$ VSA Performance Of A High Selectivity Adsorbent The $O_2$ VSA performance of a high capacity ($DN_2$=1.0 mmol/g from 0.2 to 1.2 atm at 23° C.), high isothermal binary working selectivity ($DN_2/DO_2$=22.1, calculated using IAST for an air feed at 23° C. and 1.45 atm and evacuation at 0.2 atm) adsorbent was simulated and optimized by the procedure described above. This simulation/optimization procedure was then repeated for the same selectivity with different capacities ranging from an isothermal $N_2$ working capacity of 1.0 mmol/g to 0.2 mmol/g. Within the simulation, the capacity was varied by varying the monolayer capacity of $N_2$ and $O_2$ on the adsorbent.

As the optimum sets of operating conditions were not identical for all capacities, it was necessary to choose a single set of conditions at which to compare the effect of capacity on adsorbent performance. Therefore, each adsorbent was then simulated at the optimum operating conditions identified for the optimum isothermal $N_2$ working capacity. The conditions used for this adsorbent were an end-of-feed temperature of 75° F., a feed pressure of 1000 torr, and an evacuation pressure of 300 torr. The results of this study are in Table I.

TABLE I

O$_2$ VSA Performance Of High Selectivity (DN$_2$/DO$_2$ = 22.1) Adsorbents With Various N$_2$ Working Capacities

| Isothermal N$_2$ Working Capacity 23° C. (0.2–1.2 atm) (mmol/g) | Simulation Results | | | Temp. Swing (°F.) |
|---|---|---|---|---|
| | Recovery (%) | ACF/lb mol Evacuated | BSF (lb/lb mol) | |
| 1.00 | 63.0 | 766 | 11971 | 19.2 |
| 0.95 | 63.3 | 762 | 12241 | 18.6 |
| 0.80 | 64.0 | 748 | 13304 | 16.6 |
| 0.67 | 64.3 | 733 | 14588 | 14.8 |
| 0.54 | 64.1 | 715 | 16669 | 12.6 |
| 0.50 | 63.9 | 708 | 17469 | 11.9 |
| 0.35 | 62.1 | 677 | 22285 | 9.0 |
| 0.20 | 56.9 | 627 | 33505 | 5.7 |

Surprisingly, the maximum recovery of 64.3% is observed at an intermediate working capacity of 0.67 mmol/g, not at the maximum working capacity investigated of 1.0 mmol/g. In addition, there is a substantial decrease in ACF/Evac with decrease in capacity. These two factors result in considerable power savings by lowering the amount of feed gas that must be compressed and lowering the power requirements for evacuation.

Figure 2:
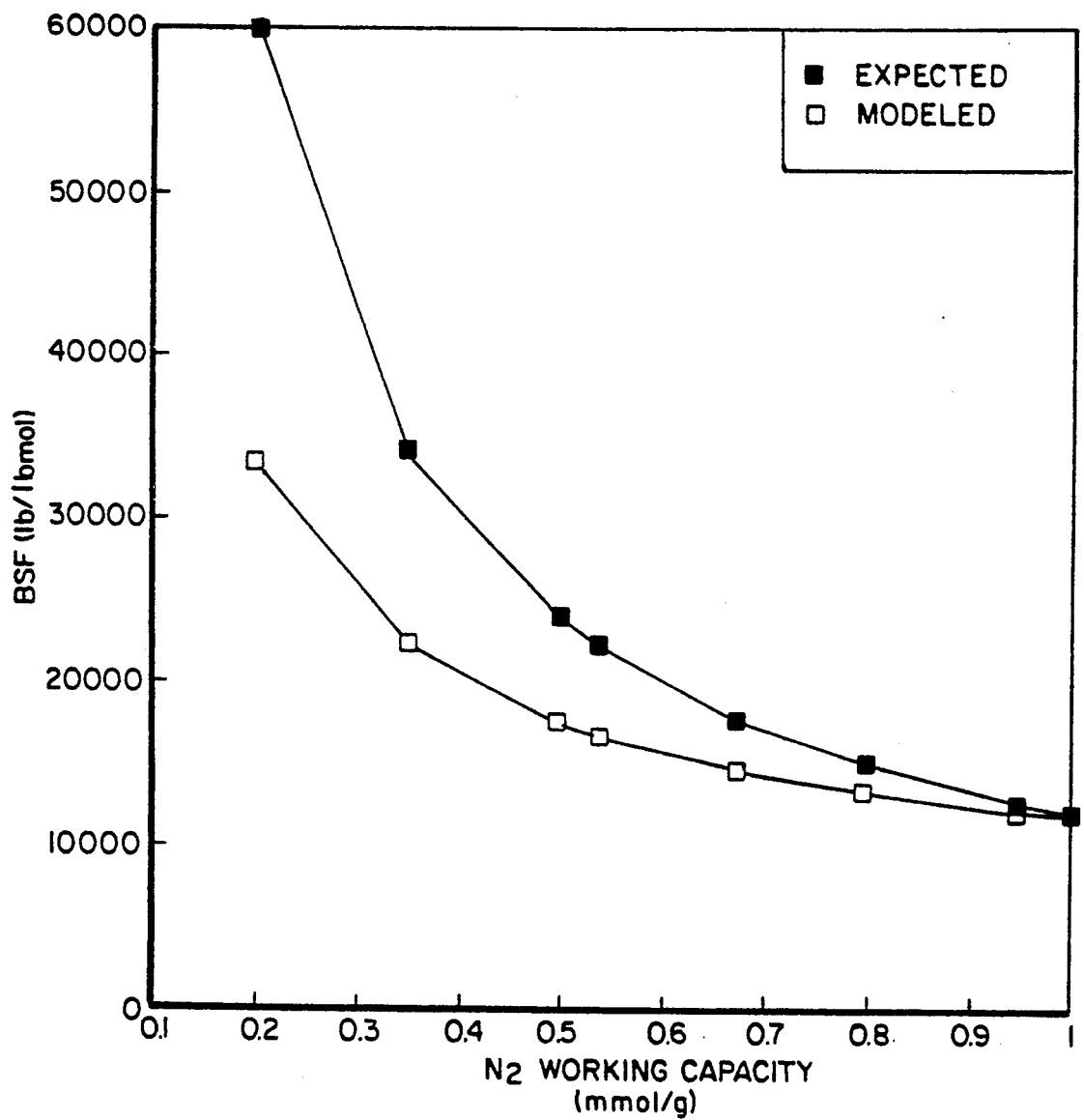
FIG. 2 is a plot of BSF as a function of isothermal $N_2$ working capacity (from 0.2 to 1.2 atm, at 23° C.) at constant selectivity showing that expected BSF is higher than actual modeled results for an adsorbent with an isothermal binary working selectivity ($DN_2/DO_2$) of 22.1.

As expected, the decrease in isothermal $N_2$ working capacity causes the Bed Size Factor to increase. However, as shown in FIG. 2, the BSF does not increase as much as expected based on the decrease in capacity. For example, when capacity for an adsorbent that has a BSF of 11971 is reduced by 50%, (i.e., isothermal $N_2$ working capacity is reduced from 1.00 mmol/g to 0.50 mmol/g in Table I) the expected BSF is $(1.00/0.50) \times 11{,}971 = 23942$, a 100% increase; however, the simulation results show BSF = 17496, an increase of only 46%. The decrease in capacity dramatically reduces the temperature swings in the bed, which is thought to account for the improved performance. The depression in temperature swing with decreasing capacity can be seen in Table I, where the temperature swing is defined as the difference between the temperature of the bed at the end of feed (in this case, 75° F.) and the temperature at the end of the evacuation step. At some low capacity, benefits from additional decreases in temperature swings do not overcome the detrimental effects of losses of $O_2$ in the voids and recovery begins to decrease with further decrease in capacity.

EXAMPLE 2

Effect Of Isothermal $N_2$ Working Capacity On $O_2$ VSA Performance For A Variety Of Adsorbents With Different Selectivities The procedure set forth in Example 1 was used to determine the effect of isothermal $N_2$ working capacity on the $O_2$ VSA performance of adsorbents with a range in isothermal binary working selectivities considered useful for air separation. The set of conditions identified at the optimum capacity is not identical for all materials; however, as set forth in Example 1, only one set of operating conditions was used for all capacities for a given selectivity. In this way, optimal performance for each selectivity can be compared.

Example 1 demonstrated that the BSF for a given adsorbent does not increase by the amount expected for the associated capacity loss. Similar plots for all materials studied show the same effect.

Figure 3:
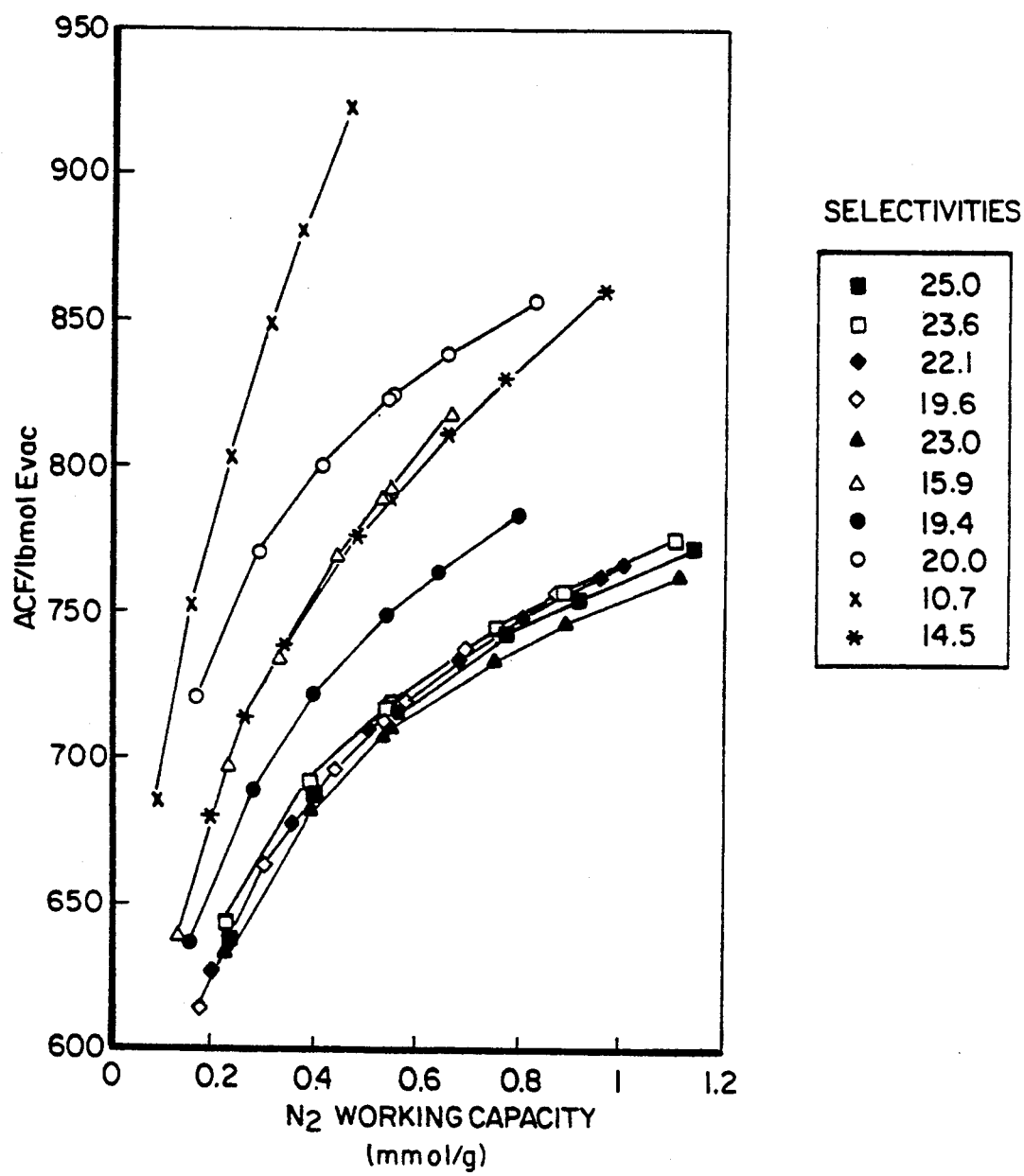
FIG. 3 is a plot of ACF/Evac as a function of isothermal $N_2$ working capacity (from 0.2 to 1.2 atm, at 23° C.) at constant selectivity for adsorbents with different isothermal binary working selectivities as indicated in the legend showing that ACF/Evac decreases with decreasing capacity.

The effect of capacity on ACF/lbmol Evacuated for these materials is shown in FIG. 3. ACF/Evac decreases with decreasing capacity in all cases.

Figure 4:
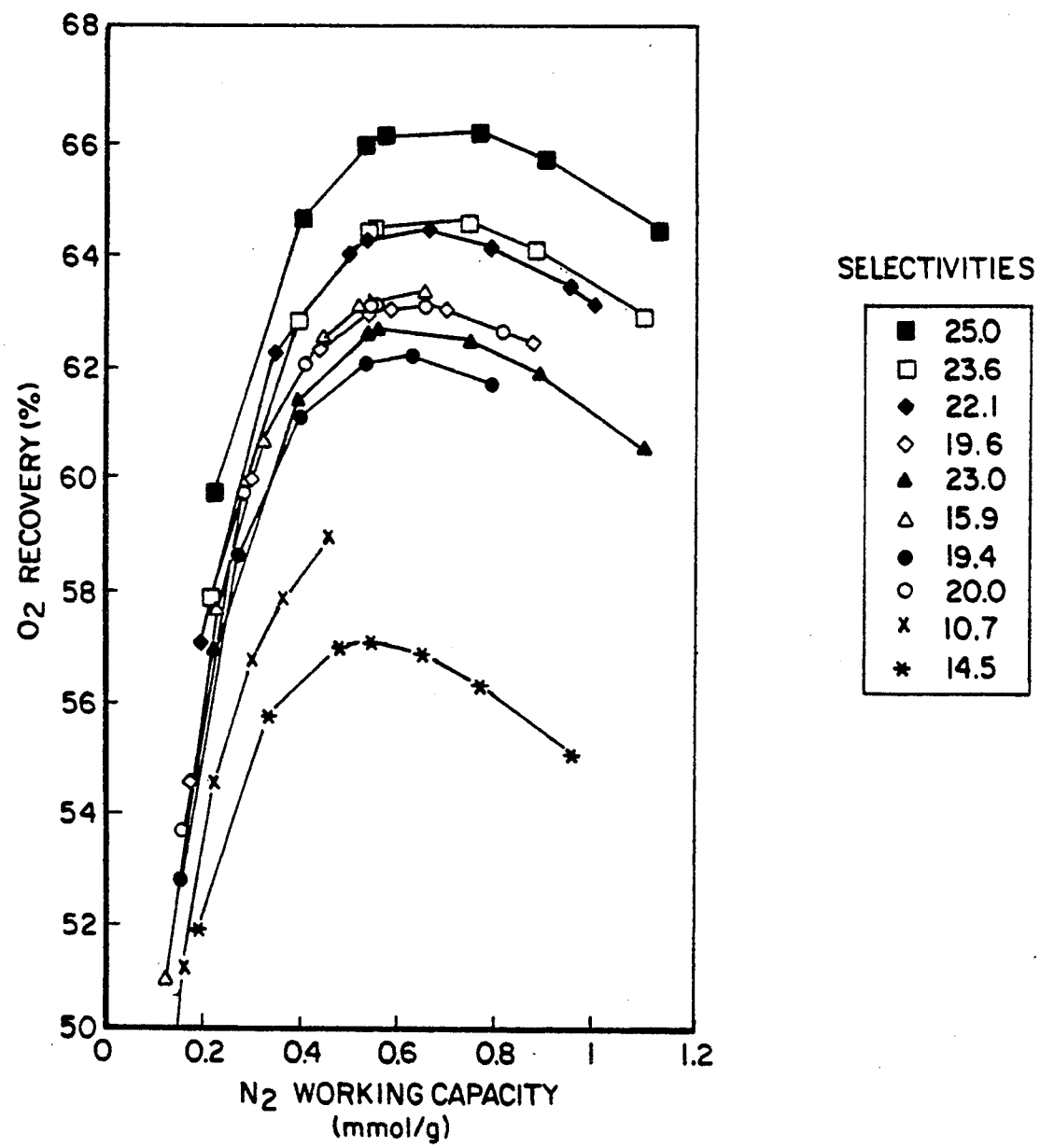
FIG. 4 is a plot of $O_2$ Recovery as a function of isothermal $N_2$ working capacity (from 0.2 to 1.2 atm, at 23° C.) at constant selectivity for adsorbents with different isothermal binary working selectivities as indicated in the legend showing that the optimum Recovery occurs in the isothermal $N_2$ working capacity range of 0.4 to 0.6 mmol/g.

The effect of capacity on $O_2$ recovery is shown in FIG. 4. With the exception of two of the adsorbents studied, recovery increases slightly with decreasing capacity to a maximum and then decreases sharply with further decrease in capacity below an isothermal $N_2$ working capacity of about 0.3 mmol/g.

Therefore, decreasing the capacity of high-capacity adsorbents has three major effects on performance: 1) the $O_2$ recovery shows a maximum, 2) the ACF/lbmol Evacuated decreases, resulting in reduction of power requirements, and 3) the BSF does not increase by nearly the amount expected solely from the reduction in capacity. As with all commercial processes, the ultimate interest in improved performance is decreased product cost. The power advantages of lower ACF/Evac, will allow for significant cost benefits. In the capacity ranges that result in increased recovery, the cost advantage of lower power is clear. Table II contains the isothermal $N_2$ working capacity (from 0.2 to 1.2 atm, 23° C.) for each material that optimizes $O_2$ recovery. In general, the performance improvement for an $O_2$ VSA process at the pressures studied is greatest at an isothermal $N_2$ working capacity of about 0.4 to 0.6 mmol/g, the region of maximum $O_2$ Recovery.

This example shows the unexpected result that for materials with the same binary isothermal working selectivity, those with lower isothermal $N_2$ working capacity give higher recovery and therefore lower power consumption levels in $O_2$ VSA, provided that they have an isothermal $N_2$ working capacity of at least about 0.3 mmol/g. The range of optimum isothermal $N_2$ working capacities (0.4 to 0.6 mmol/g) is roughly the same level observed for current commercial air separation adsorbents such as CaA. Thus, the key to improved air separation adsorbents is lower $O_2$ capacity with $N_2$ capacity at roughly the same level as current adsorbents.

TABLE II

Isothermal N$_2$ Working Capacities Which Optimize Recovery

| Isothermal Binary DN$_2$/DO$_2$ Of Adsorbents | Range Investigated N$_2$ Working Capacity 23° C. (0.2–1.2 atm) (mmol/g) | N$_2$ Working Capacity 23° C. @ Opt. (0.2–1.2 atm) (mmol/g) |
|---|---|---|
| 25.0 | 1.14 –0.23 | 0.9 –0.5 |
| 23.6 | 1.10–0.22 | 0.9–0.5 |

TABLE II-continued

Isothermal $N_2$ Working Capacities Which Optimize Recovery

| Isothermal Binary $DN_2/DO_2$ Of Adsorbents | Range Investigated $N_2$ Working Capacity 23° C. (0.2-1.2 atm) (mmol/g) | $N_2$ Working Capacity 23° C. @ Opt. (0.2-1.2 atm) (mmol/g) |
|---|---|---|
| 22.1 | 1.00–0.20 | 0.9–0.5 |
| 19.6 | 0.87–0.19 | 0.9–0.4 |
| 23.0 | 1.10–0.22 | 0.8–0.5 |
| 15.9 | 0.65–0.13 | 0.6–0.5 |
| 19.4 | 0.79–0.16 | 0.8–0.4 |
| 20.0 | 0.82–0.16 | 0.8–0.4 |
| 10.7 | 0.46–0.16 | — |
| 14.5 | 0.95–0.19 | 0.7–0.4 |

EXAMPLE 3

Effect Of Doubling The Capacity Of A Very High Selectivity Adsorbent

The effect of changing the isothermal $N_2$ working capacity of an extremely high-selectivity theoretical adsorbent to outside the preferred range of $N_2$ working capacity is illustrated in this example. Isothermal nitrogen working capacity and isothermal binary working selectivity were calculated for an air feed at 23° C. and 1.45 atm and evacuation at 0.2 atm. The adsorbent had an isothermal $N_2$ working capacity of 0.52 mmol/g and an isothermal binary working selectivity of 62.0. The isothermal $N_2$ working capacity was varied outside the preferred range of 0.4 to 0.6 mmol/g by increasing the capacity by a factor of two and decreasing the capacity by a factor of two.

The process model was used to simulate an $O_2$ VSA process at a feed pressure of 1095 torr, an evacuation pressure of 218 torr, and an end-of-feed temperature of 75° F., giving the following results:

| $DN_2$ | $DN_2/DO_2$ | Recovery | ACF/Evac | BSF | Relative $O_2$ Product Costs |
|---|---|---|---|---|---|
| 0.26 | 62.0 | 75.4 | 794 | 15,918 | Middle |
| 0.52 | 62.0 | 83.1 | 923 | 8,880 | Lowest |
| 1.03 | 62.0 | 87.1 | 1147 | 5,089 | Highest |

These results show that the optimal performance is observed for the working capacity in the preferred range of 0.4 to 0.6 mmol/g. Contrary to what might be expected based on the prior art, doubling the capacity actually results in poorer performance, resulting in a higher $O_2$ cost.

EXAMPLE 4

Concept Of Isothermal Binary Working Selectivity Used To Delineate The Region Of Improved Adsorbents Compared To Representative Adsorbents Known In The Prior Art $O_2$ VSA computer process simulations have shown the unexpected result that for materials with the same working selectivity, those with lower isothermal nitrogen working capacity are superior $O_2$ VSA adsorbents, provided that they have a nitrogen working capacity of at least about 0.3 mmol/g. The optimum capacity was shown to be about 0.4–0.6 mmol/g. The present invention has also shown that the concept of isothermal binary working selectivity can be used to relate the intrinsic properties of the adsorbent to the $O_2$ Recovery. This example uses these two new concepts to delineate the region of intrinsic properties of adsorbents that will exhibit improved performance over adsorbents known in the prior art.

Figure 5:
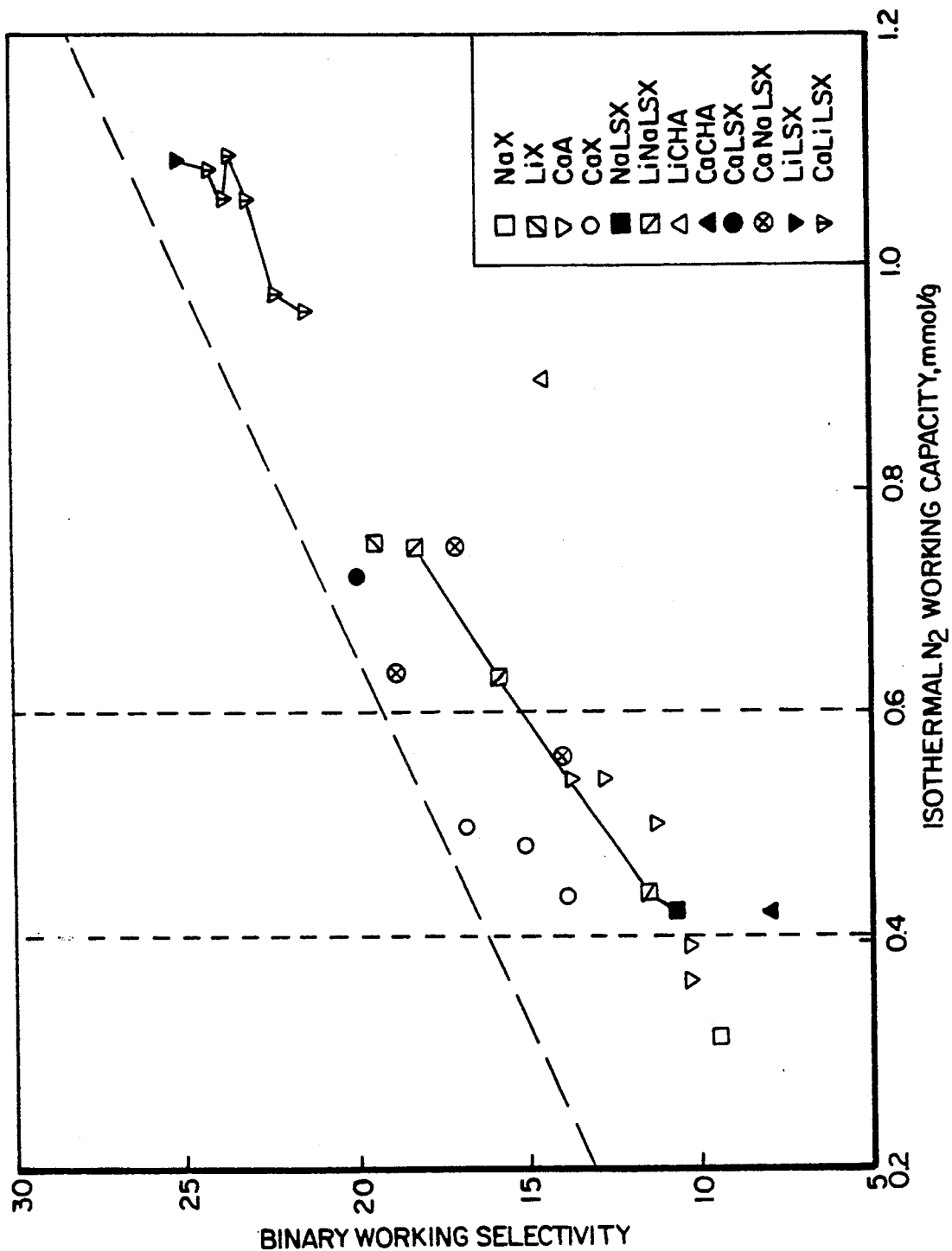
FIG. 5 is a plot of isothermal binary working selectivity ($DN_2/DO_2$) (mmol $N_2$/mmol $O_2$) as a function of isothermal $N_2$ working capacity (mmol/g) determined at an air feed pressure of 1.45 atm and evacuation pressure of 0.2 atm at 23° C. for a variety of adsorbents. The data points for CaA and CaX represent various vendor formulations, while the data points for LiNaLSX, CaNaLSX and CaLiLSX represent various exchange levels of the first mentioned cations for each.

Isothermal nitrogen working capacity (mmol/g) and isothermal binary working selectivity (mmol $N_2$/mmol $O_2$) were calculated using IAST for an air feed at 23° C. and 1.45 atm and evacuation at 0.2 representative adsorbents known in the prior art: NaX-Zeolite, (Ca,Na)A-Zeolite, NaMordenite, (Ca,Na)X-Zeolite, (Ca,Na)LSX-Zeolite, LiX-Zeolite, (Li,Na)LSX-Zeolite, LiChabazite, (Li,Ca)LSX-Zeolite. FIG. 5 displays a plot of isothermal binary working selectivity vs. isothermal $N_2$ working capacity. Adsorbents known in the prior art all fall below a line defined by the point with a nitrogen working capacity ($DN_2$) of about 0.6 mmol/g and a binary working selectivity of 19 and the point with a nitrogen working capacity of about 1.0 mmol/g and a binary working selectivity of 25. This line is defined by the equation $DN_2 = 0.0667 \times (S) - 0.667$, where S is the isothermal binary working selectivity. New adsorbents with intrinsic properties that fall above this line will demonstrate superior $O_2$ VSA performance compared to other adsorbents with the same working selectivity known in the prior art, all of which have higher nitrogen working capacities, provided that the new adsorbents have a nitrogen isothermal working capacity of at least about 0.3 mmol/g.

EXAMPLE 5

Zeolite/Diluent Mixtures as Adsorbents

One way of obtaining new adsorbents with adsorptive properties that fall in the region delineated in Example 4 for improved performance is the dilution of high nitrogen capacity adsorbents having high selectivity. Accordingly, dilution of zeolites with binary isothermal working selectivities greater than 17, such as LiLSX-Zeolite, (Li,Ca)LSX-Zeolite, (Li,Ca,Na)LSX-Zeolite, CaLSX-Zeolite, LiX-Zeolite, etc., will provide zeolite/diluent mixtures as improved adsorbents with combinations of isothermal binary working selectivity and isothermal nitrogen working capacity that fall above the line in FIG. 5 and that meet the unexpected superior performance of a P/VSA process of the present invention. For example, zeolitic adsorbents used in demonstrating the effect of dilution were prepared in the following ways. (Na,K)LSX-zeolite powder was prepared by the method of Kuhl and Sherry in UK 1580928. (See also Kuhl, G.H. Zeolites 1987, 7, 451). LiLSX-Zeolite was prepared by ion exchange of (Na,K)LSX-zeolite powder to appropriate amounts of 0.05 M $CaCl_2$ and stirring at room temperature for about 4 h. The samples were filtered but not washed to prevent hydrolysis of the Li cations. Various samples of (Li,Ca,Na)LSX-zeolite were prepared similarly by adding LiLSX-zeolite powder to appropriate amounts of 0.1N solution containing stoichiometric amounts of $CaCl_2$ and NaCl. The samples were filtered but not washed. CaLSX-zeolite was prepared by ion exchange of (Na,K)LSX-zeolite using three static exchanges at 100° C. with a 3.8-fold equivalent excess of 1.0 M $CaCl_2$. LiX-zeolite was prepared from Linde 13X (NaX-zeolite with a Si/Al ratio of 1.23) using five static exchanges at 100° C. with a 5.6-fold equivalent excess of 1.1 M LiCl.

Adsorption measurements were made using an automated high pressure volumetric adsorption unit. Approximately 2–2.5 g of sample was loaded into a stainless steel sample cylinder protected with a 10-micron filter to prevent loss of sample. The samples were heated under vacuum at 1° C./min or less to 400° C. until the pressure dropped below $1\times 10^{-5}$ torr. After activation, $N_2$ and $O_2$ isotherms were obtained to 12000 torr at 23° and 45° C. Isothermal $N_2$ working capacity was determined from 0.2 to 1.2 atm, at 23° C. Multicomponent equilibria were estimated by IAST. Isothermal binary working selectivity was calculated for an air feed at 23° C. and 1.45 atm. and evacuation at 0.2 atm.

Table III lists six zeolites prepared in the manner described above that have isothermal binary working selectivities greater than 17. These active adsorbent phases can be combined with diluent to give adsorbents with adsorptive properties that fall into the region delineated in Example 4 for improved performance. Table III lists a range of appropriate wt % diluent for each active adsorbent phase to give adsorbents with isothermal nitrogen working capacities less than $0.0667\times(S)-0.667$, but more than 0.3 mmol/g. These adsorbents demonstrate improved overall performance compared to adsorbents with the same selectivity but with isothermal nitrogen working capacity greater than $0.0667\times(S)-0.667$. The improved performance was demonstrated in Examples 1 and 2. For example, LiLSX has an isothermal binary working selectivity of 25. Example 2 demonstrated that adsorbents with an isothermal binary working selectivity of 25 and isothermal nitrogen working capacity between 0.5 and 0.9 mmol/g (i.e., less than $0.0667\times(S)-0.667$) have higher Recovery, lower ACF, and BSF less than expected compared to an adsorbent with an isothermal nitrogen working capacity of 1.14 (i.e., greater than $0.0667\times(S)-0.667$).

TABLE III

Improved Adsorbents Using Zeolite/Diluent Mixtures

| active adsorbent phase | | | improved adsorbents | |
| --- | --- | --- | --- | --- |
| identity | isothermal binary working selectivity | isothermal $N_2$ working capacity, mmol/g | range of diluent, wt % | isothermal $N_2$ working capacity, mmol/g |
| LiSX | 25.0 | 1.14 | 20–55 | 0.9–0.5 |
| 85/15 (Li, Ca)LSX | 23.6 | 1.10 | 20–55 | 0.9–0.5 |
| 85/10/5 (Li, Ca, Na)LSX | 22.1 | 1.00 | 20–52 | 0.8–0.5 |
| 70/30 (Li, Ca) LSX | 23.0 | 1.10 | 25–57 | 0.8–0.5 |
| LiX | 19.4 | 0.79 | 22–45 | 0.6–0.4 |
| CaLSX | 20.0 | 0.82 | 20–45 | 0.7–0.4 |

Although not wanting to be held to any particular theory of the present invention, it is believed that the benefits of lower isothermal $N_2$ working capacity are related to the effect of temperature on the shape of the isotherm. The heat effects that occur during the adsorption and desorption steps can be of significance in the overall performance of PSA processes. Since the processes are essentially adiabatic, release of heat from the heat of adsorption increases the bed temperature during the adsorption step. Because of the higher temperature, adsorbate loading at the end of adsorption is lower than would be the case if the temperature did not increase. Likewise, during the desorption and optional purge steps, heat is required to desorb the adsorbate, decreasing the bed temperature. Because of the lower temperature, adsorbate loading at the end of desorption is higher than would be the case if the temperature did not decrease. These fluctuations in temperature reduce the overall adiabatic working capacity of the bed.

Therefore, reduction of the temperature rise during the adsorption step of a PSA process results in higher adsorbate loading; likewise, reduction of the temperature decrease during the desorption step results in lower adsorbate loading. The net effect is increased adiabatic working capacity, resulting in lower BSF than expected. Since $N_2$ has a higher heat of adsorption than $O_2$, the effect should be larger for $N_2$. Thus, the adiabatic binary working selectivity (the ratio of the adiabatic nitrogen working capacity to the adiabatic oxygen working capacity) should increase as temperature fluctuations decrease, resulting in lower loss in recovery from $O_2$ adsorbed on the bed. In addition, reduction of temperature swings will result in a higher bed temperature during the desorption/evacuation step. This effectively "flattens" the isotherm, leaving a decreased amount of gas to be removed in the low pressure region, which provides a benefit in decreased ACF/Evac.

The present invention has been set forth with regard to several preferred embodiments, but the full scope of the invention should be ascertained from the claims which follow:

We claim:

1. The process of adsorbing nitrogen from a gas containing nitrogen, comprising; contacting the gas in an adsorption zone with an adsorbent selective for nitrogen and adsorbing nitrogen on the adsorbent, wherein the adsorbent zone comprises an adsorbent with an isothermal nitrogen working capacity of at least about 0.3 mmol/g and a binary isothermal working selectivity of at least 17 mmol $N_2$/mmol $O_2$ but whose nitrogen working capacity at any given working selectivity (S) does not exceed the value: $0.0667\times(S)-0.667$.

2. The process of claim 1, wherein the isothermal nitrogen working capacity is at least 0.4 mmol/g.

3. The process of claim 1 wherein the isothermal nitrogen working capacity is no greater than 1.0 mmol/g.

4. The process of claim 1 wherein the isothermal nitrogen working capacity is between 0.4 and 0.6 mmol/g.

5. The process of claim 1 wherein said adsorbent comprises an active adsorbent phase and optionally an inert diluent.

6. The process of claim 5 wherein said active adsorbent phase is selected from the group consisting of zeolite, silica-alumina, alumina, silica, titanium silicates, phosphates and mixtures thereof.

7. The process of claim 5 wherein said active adsorbent phase is a zeolite selected from the group consisting of A-zeolite, X-zeolite, Y-zeolite, chabazite, mordenite and mixtures thereof.

8. The process of claim 7 wherein the zeolite is ion exchanged with lithium to at least approximately 50%.

9. The process of claim 8 wherein the zeolite is ion exchanged with a second ion to approximately 5% to 50%.

10. The process of claim 9 wherein the zeolite is ion exchanged with approximately 15% of the second ion and 85% lithium.

11. The process of claim 9 wherein the second ion is selected from the group consisting of calcium, strontium and mixtures thereof.

12. The process of claim 11 wherein the zeolite is ion exchanged with approximately 15% calcium and 85% lithium.

13. The process of claim 5 wherein said active adsorbent phase has a zeolithic silicon to aluminum ratio less than or equal to 1.5.

14. The process of claim 1 wherein the gas contains nitrogen and oxygen.

15. The process of claim 1 wherein the gas is air.

16. The process of claim 1 wherein an oxygen and nitrogen-containing gas contacts said adsorbent zone, the nitrogen is selectively adsorbed and the oxygen passes through said zone and is recovered as an oxygen-enriched product.

17. The process of claim 16 wherein the oxygen product has a purity of at least approximately 90% oxygen.

18. The process of claim 16 wherein said zone is operated through a series of steps comprising: adsorption during which the gas contacts said active adsorbent phase, nitrogen is selectively adsorbed and oxygen passes through the zone and is removed; depressurization during which the gas contact is discontinued and the zone is reduced in pressure to desorb the nitrogen; and repressurization with oxygen or said gas to the adsorption pressure.

19. The process of claim 16 wherein said zone is operated through a series of steps comprising: adsorption during which the gas contacts said active adsorbent phase, nitrogen is selectively adsorbed and oxygen passes through the zone and is removed; depressurization during which the gas contact is discontinued and the zone is reduced in pressure to desorb the nitrogen; evacuation to further desorb the nitrogen to below ambient pressure; and repressurization with oxygen or said gas to the adsorption pressure.

* * * * *